United States Patent
Mangia et al.

(10) Patent No.: US 12,540,993 B2
(45) Date of Patent: Feb. 3, 2026

(54) SYSTEMS AND METHODS FOR MULTI-FIELD-OF-VIEW IMAGING

(71) Applicant: Regents of the University of Minnesota, Minneapolis, MN (US)

(72) Inventors: Silvia Mangia, Minneapolis, MN (US); Shalom Michaeli, Minneapolis, MN (US); Djaudat Idiyatullin, Minneapolis, MN (US); Gregor Adriany, Minneapolis, MN (US); Mikko Kettunen, Minneapolis, MN (US); Michael Garwood, Minneapolis, MN (US); Olli Gröhn, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 115 days.

(21) Appl. No.: 18/358,676

(22) Filed: Jul. 25, 2023

(65) Prior Publication Data

US 2024/0027558 A1  Jan. 25, 2024

Related U.S. Application Data

(60) Provisional application No. 63/392,100, filed on Jul. 25, 2022.

(51) Int. Cl.
*G01R 33/56* (2006.01)
*G01R 33/36* (2006.01)
(Continued)

(52) U.S. Cl.
CPC ..... *G01R 33/5608* (2013.01); *G01R 33/3664* (2013.01); *G01R 33/543* (2013.01); *G01R 33/5611* (2013.01); *G01R 33/5616* (2013.01)

(58) Field of Classification Search
CPC ............ G01R 33/5616; G01R 33/5611; G01R 33/543; G01R 33/3664; G01R 33/5608
See application file for complete search history.

(56) References Cited

U.S. PATENT DOCUMENTS 3,975,675 A    8/1976  Dunand et al.
6,573,715 B2   6/2003  King et al.
(Continued)

FOREIGN PATENT DOCUMENTS

WO    WO2013030585 A1    3/2013

OTHER PUBLICATIONS

Jurgen Finsterbusch, Christian Sprenger, Christian Buchel, Combined T2-weighted measurements of the human brain and cervical spinal cord with a dynamic shim update, NeuroImage, vol. 79, 2013, pp. 153-161, ISSN 1053-8119, https://doi.org/10.1016/j.neuroimage.2013.04.021 (Year: 2013).*

(Continued)

*Primary Examiner* — Gregory H Curran
(74) *Attorney, Agent, or Firm* — QUARLES & BRADY LLP

(57) ABSTRACT

Systems and methods for producing an image of a subject with a magnetic resonance imaging (MRI) system. The method includes acquiring first MRI data from the subject using a first coil having a first field of view (FOV), simultaneously with or sequentially with acquiring the first MRI data, acquiring second MRI data from the subject using a second coil having a second FOV that is non-overlapping with the first FOV, and reconstructing images of the subject from the first MRI data and the second MRI data.

23 Claims, 9 Drawing Sheets

(51) Int. Cl.
    G01R 33/54     (2006.01)
    G01R 33/561    (2006.01)

(56) References Cited

U.S. PATENT DOCUMENTS

| | | | |
|---|---|---|---|
| 6,670,811 | B2 | 12/2003 | Wind et al. |
| 6,836,115 | B2 | 12/2004 | Wind et al. |
| 7,403,006 | B2 | 7/2008 | Garwood et al. |
| 7,944,206 | B2 | 5/2011 | Frydman et al. |
| 8,519,707 | B2 | 8/2013 | Corum et al. |
| 8,698,497 | B2 * | 4/2014 | Hollis .............. G01R 33/385 324/318 |
| 8,750,642 | B2 | 6/2014 | Corum et al. |
| 8,933,698 | B2 | 1/2015 | Corum et al. |
| 9,864,032 | B2 * | 1/2018 | Chang .................. A61N 7/02 |
| 9,880,243 | B2 | 1/2018 | Corum et al. |
| 10,180,475 | B2 | 1/2019 | Idiyatullin et al. |
| 11,719,774 | B2 * | 8/2023 | Kawajiri ............ G01R 33/3664 324/318 |
| 2016/0139222 | A1 | 5/2016 | Frydman et al. |
| 2023/0291111 | A1 * | 9/2023 | Liu .................... H01Q 1/38 |

OTHER PUBLICATIONS

Adriany et al., Transmit and receive transmission line arrays for 7 Tesla parallel imaging, Magnetic Resonance in Medicine, 2005, 53(2):434-445.

Adriany et al., A geometrically adjustable 16-channel transmit/receive transmission line array for improved RF efficiency and parallel imaging performance at 7 Tesla, Magnetic Resonance in Medicine, 2008, 59(3):590-597.

Athanasiou et al., A systematic review of investigations into functional brain connectivity following spinal cord injury, Frontiers in Human Neuroscience, 2017, 11(517), pp. 1-9.

Avdievich et al., Resonant inductive decoupling (RID) for transceiver arrays to compensate for both reactive and resistive components of the mutual impedance, NMR in Biomedicine, 2013, 26(11):1547-1554.

Canna et al., Brain fMRI during orientation selective epidural spinal cord stimulation, Scientific Reports, 2021, 11(1):5504.

Figley et al., In contrast to BOLD: signal enhancement by extravascular water protons as an alternative mechanism of endogenous fMRI signal change, Magnetic Resonance Imaging, 2010, 28(8):1234-1243.

Figley et al., Measurement and characterization of the human spinal cord SEEP response using event-related spinal fMRI, Magnetic Resonance in Imaging, 2012, 30(4):471-484.

Fratini et al., On the impact of physiological noise in spinal cord functional MRI, Journal of Magnetic Resonance Imaging, 2014, 40(4):770-777.

Froidevaux et al., Pulse encoding for ZTE imaging: RF excitation without dead-time penalty, Magnetic Resonance in Medicine, 2022, 87(3):1360-1374.

Functional Imaging Laboratory, UCL Queen Square Institute of Neurology, Statistical Parametric Mapping, Retrieved from www.fil.ion.ucl.ac.uk/spm, Copyright 1991, 1994-2023 FIL, 2 pages.

Giove et al., Issues about the fMRI of the human spinal cord, Magnetic Resonance Imaging, 2004, 22(10):1505-1516.

Giulietti et al., Characterization of the functional response in the human spinal cord: Impulse-response function and linearity, Neuroimage, 2008, 42(2):626-634.

Glover et al., Image-based method for retrospective correction of physiological motion effects in fMRI: Retroicor, Magnetic Resonance in Medicine, 2000, 44(1): 162-167.

Goense et al., Neurophysiology of the BOLD fMRI signal in awake monkeys, Current Biology, 2008, 18(9):631-640.

Graedel et al., Motion correction for functional MRI with three-dimensional hybrid radial-C artesian EPI, Magnetic Resonance in Medicine, 2017, 78(2):527-540.

Grodzki et al., Ultrashort echo time imaging using pointwise encoding time reduction with radial acquisition (PETRA), Magnetic Resonance in Medicine, 2012, 67(2):510-518.

Gureviciene et al., Normal induction but accelerated decay of LTP in App+ PS1 transgenic mice, Neurobiology of Disease, 2004, 15(2):188-195.

Gurevicius et al., Increased cortical and thalamic excitability in freely moving APPswe/PS1dE9 mice modeling epileptic activity associated with Alzheimer's disease, Cerebral Cortex, 2013, 23(5):1148-1158.

Harita et al., Confirmation of resting-state BOLD fluctuations in the human brainstem and spinal cord after identification and removal of physiological noise, Magnetic Resonance in Medicine, 2017, 78(6):2149-2156.

Harita et al., Investigation of resting-state BOLD networks in the human brainstem and spinal cord, Neuroscience, 2019, 404:71-81.

Idiyatullin et al., Fast and quiet MRI using a swept radiofrequency, Journal of Magnetic Resonance, 2006, 181(2):342-349.

Idiyatullin et al., Multi-band-SWIFT, Journal of Magnetic Resonance, 2015, 251:19-25.

Idiyatullin, Swift, ISMRM Annual Scientific Meeting & Exhibition, 2015.

Islam et al., Dynamic per slice shimming for simultaneous brain and spinal cord fMRI, Magnetic Resonance in Medicine, 2019, 81(2):825-838.

James et al., Conduction failure following spinal cord injury: functional and anatomical changes from acute to chronic stages, Journal of Neuroscience, 2011, 31(50):18543-18555.

Juchem et al., Dynamic multi-coil shimming of the human brain at 7 T, Journal of Magnetic Resonance, 2011, 212(2):280-288.

Juchem et al., Dynamic multi-coil technique (Dynamite) shimming for echo-planar imaging of the human brain at 7 Tesla, Neuroimage, 2015, 105:462-472.

Kasper et al., The PhysIO toolbox for modeling physiological noise in fMRI data, Journal of Neuroscience Methods, 2017, 276:56-72.

Kiebel et al., Dynamic causal modeling: a generative model of slice timing in fMRI, Neuroimage, 2007, 34(4):1487-1496.

Kim et al., Functional magnetic resonance imaging with an ultra-short echo time, Madical Physics, 2013, 40(2):022301.

Kobayashi et al., Gradient-modulated petra mri, Tomography, 2015, 1(2):85-90.

Laakso et al., Spinal cord fMRI with MB-SWIFT for assessing epidural spinal cord stimulation in rats, Magnetic Resonance in Medicine, 2021, 86(4):2137-2145.

Lagore et al., Fast transmit/receive switch for SWIFT imaging at 7T, International Society for Magnetic Resonance in Medicine, 2019, 27:0573.

Landelle et al., Investigating the human spinal sensorimotor pathways through functional magnetic resonance imaging, Neuroimage, 2021, 245:118684, pp. 1-18.

Lehto et al., MB-SWIFT functional MRI during deep brain stimulation in rats, Neuroimage, 2017, 159:443-448.

Lehto et al., Tuning neuromodulation effects by orientation selective deep brain stimulation in the rat medial frontal cortex, Frontiers in Neuroscience, 2018, 12:899, pp. 1-10.

Lehto et al., Orientation selective deep brain stimulation of the subthalamic nucleus in rats, Neuroimage, 2020, 213:116750, pp. 1-10.

Logothetis et al., Neurophysiological investigation of the basis of the fMRI signal, Nature, 2001, 412 (6843):150-157.

Mangia et al., Functional MRI with SWIFT, Proceedings International Society of Magnetic Resonance in Medicine, 2012, 20:326.

Min et al., Alteration of resting-state brain sensorimotor connectivity following spinal cord injury: a resting-state functional magnetic resonance imaging study, Journal of Neurotrauma, 2015, 32(18):1422-1427.

Moeller et al., Progress in adapting SWIFT to a clinical scanner, ISMRM Annual Scientific Meeting & Exhibition, 2017, 25:4433.

Morris et al., Selective excitation in Fourier transform nuclear magnetic resonance, Journal of Magnetic Resonance, 1978, 29(3):433-462.

(56) References Cited

OTHER PUBLICATIONS

Paasonen et al., Multi-band SWIFT enables quiet and artefact-free EEG-fMRI and awake fMRI studies in rat, Neuroimage, 2020, 206:116338, pp. 1-12.
Paasonen et al., EVEnt-Recurring (EVER) MB-SWIFT fMRI with 200-ms temporal resolution during deep brain stimulation and isoflurane-induced burst suppression in rat, Magnetic Resonance in Medicine, 2022, 87(6):2872, pp. 1-19.
Paasonen et al., Whole-brain studies of spontaneous behavior in head-fixed rats enabled by zero echo time MB-Swift fMRI, Neuroimage, 2022, 250:118924, pp. 1-13.
Parker et al., The benefit of slice timing correction in common fMRI preprocessing pipelines, Frontiers in Neuroscience, 2019, 13:821, pp. 1-22.
Piche et al., Tight neurovascular coupling in the spinal cord during nociceptive stimulation in intact and spinal rats, Neuroscience, 2017, 355:1-8.
Powers et al., Ten key insights into the use of spinal cord fMRI, Brain Sciences, 2018, 8(9): 173, pp. 1-23.
Rahmer et al., Three-dimensional radial ultrashort echo-time imaging with T2 adapted sampling, Magnetic Resonance in Medicine, 2006, 55(5):1075-1082.
Saff et al., Distributing many points on a sphere, The Mathematical Intelligencer, 1997, 19:5-11.
Sarkka et al., Dynamic retrospective filtering of physiological noise in BOLD fMRI: Drifter, Neuroimage, 2012, 60(2):1517-1527.
Solin et al., Catching physiological noise: comparison of Drifter in image and k-space, Proceedings of the International Society for Magnetic Resonance in Medicine, 2014, 22:2791.
Song, A simple technique for reducing aliasing artifacts in projection reconstruction MRI, Proceedings of the 9th Annual Meeting of ISMRM, 2001, 9:739.
Stnava, ANTs, Advanced Normalization Tools, Retrieved from http://stnava.github.io/ANTs/, Version Accessed on Jan. 26, 2024, 5 pages.
Stroman et al., Extravascular proton-density changes as a non-BOLD component of contrast in fMRI of the human spinal cord, Magnetic Resonance in Medicine, 2002, 48(1):122-127.
Tustison et al., N4ITK: improved N3 bias correction, IEEE Transactions on Medical Imaging, 2010, 29(6):13010-1320.
Vahdat et al., Simultaneous brain-cervical cord fMRI reveals intrinsic spinal cord plasticity during motor sequence learning, PLoS Biology, 2015, 13(6):e1002186, pp. 1-25.
Vahdat et al., Resting-state brain and spinal cord networks in humans are functionally integrated, PLoS Biology, 2020, 18(7):e3000789, pp. 1-22.
Weiger et al., ZTE imaging in humans, Magnetic Resonance in Medicine, 2013, 70(2):328-332.
Weiger et al., Short-T2 MRI: Principles and recent advances, Progress in Nuclear Magnetic Resonance Spectroscopy, 2019, 114:237-270.
Wu et al., Intrinsic functional architecture of the non-human primate spinal cord derived from fMRI and electrophysiology, Nature Communications, 2019, 10(1):1416, pp. 1-10.

* cited by examiner

SYSTEMS AND METHODS FOR MULTI-FIELD-OF-VIEW IMAGING

CROSS-REFERENCE TO RELATED APPLICATIONS

This application claims priority to U.S. Provisional Patent Application No. 63/392,100 filed on Jul. 25, 2022, the entire contents of which is incorporated herein by reference.

STATEMENT REGARDING FEDERALLY SPONSORED RESEARCH

This invention was made with government support under N5129739, and EB027061 awarded by the National Institutes of Health. The government has certain rights in the invention.

BACKGROUND

The present disclosure relates to systems and methods for magnetic resonance imaging ("MRI"). More particularly, the disclosure relates to systems and methods for imaging multiple fields of view ("FOVs"), for example, simultaneously.

Medical imaging is an invaluable tool in modern medicine. However, all imaging modalities present limitations and tradeoffs that the clinician must manage. For example, some clinical applications require functional or physiological information, in addition to anatomical information. For example, MRI provides exceptional anatomical images of the brain, but many clinical applications require functional information about the brain, in addition to the anatomical information. To meet this need, functional MRI (fMRI) tracking the small activation signals of the brain can be used.

While the brain is an important organ, it is part of a larger nervous system which also includes the spinal cord. Comprehensive functional assessment of the central nervous system (CNS) as a whole is crucial for numerous areas of research, including spinal cord injury, neurodegenerative diseases, pain and aging. MRI should be a key tool to gather the data required to perform a functional assessment of the CNS. However, fMRI of the CNS has been elusive so far due to several technical challenges, mostly because the proper functioning of conventional MRI techniques requires high magnetic field uniformity in a (FOV) large enough to cover both brain and spinal cord. To overcome this problem, solutions of per-slice dynamic shimming have been proposed. However, such solutions considerably prolong the experimental session, are limited by the settling-time of eddy currents and have been applied only to image the cervical spine, but not lower parts of the spinal cord. Moreover, such studies acquire sequential acquisitions of brain and spinal cord.

The limitations of traditional MRI methods when attempting to study the CNS illustrates just one shortcoming of traditional MRI systems and methods. Similar limitations present whenever a large system is being imaged, particularly, when seeking functional information.

Thus, there is a continuing need for new imaging systems and methods capable of meeting the clinical demands of studying complex anatomical and/or functional systems.

SUMMARY

The present disclosure overcomes the aforementioned drawbacks by providing systems and methods for acquiring MRI data from multiple, non-overlapping FOVs. In one, non-limiting example the multiple FOVs may be used to acquire MRI data from the brain of a subject and the entire spine of the subject, thereby yielding full CNS coverage. Irrespective of the particular clinical application, images can be produced from the MRI data from the multiple, non-overlapping FOVs that are temporally registered.

In accordance with one aspect of the disclosure, a method is provided for producing an image of a subject with a magnetic resonance imaging (MRI) system. The method includes acquiring first MRI data from the subject using a first coil having a first field of view (FOV) and, with acquiring the first MRI data, acquiring second MRI data from the subject using a second coil having a second FOV that is non-overlapping with the first FOV. The method further includes reconstructing images of the subject from the first MRI data and the second MRI data.

In accordance with another aspect of the disclosure, an MRI system is provided that includes a magnet configured to maintain a static magnetic field about a bore configured to receive a patient and a gradient system configured to apply magnetic gradients to the static magnetic field. The system further includes a radio-frequency (RF) system configured to send and receive RF energy with respect to the patient to acquire MRI data and a coil system having two non-overlapping fields of view (FOVs) configured to simultaneously acquire two distinct sets of MRI data from the patient. A computer system is included that is configured to reconstruct the two distinct sets of MRI data into images of two non-overlapping regions of the subject that are temporally registered.

In accordance with yet another aspect of the disclosure, a method is provided for producing an image of a subject with a magnetic resonance imaging (MRI) system. The method includes acquiring first MRI data from the subject using a first coil having a first field of view (FOV) that includes a head of the subject and, simultaneously with or sequentially with acquiring the first MRI data, acquiring second MRI data from the subject using a second coil having a second FOV that includes a spine of the subject. The method further includes reconstructing images of the subject including the spine and the head of the subject that are temporally registered.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

Figure 1A:
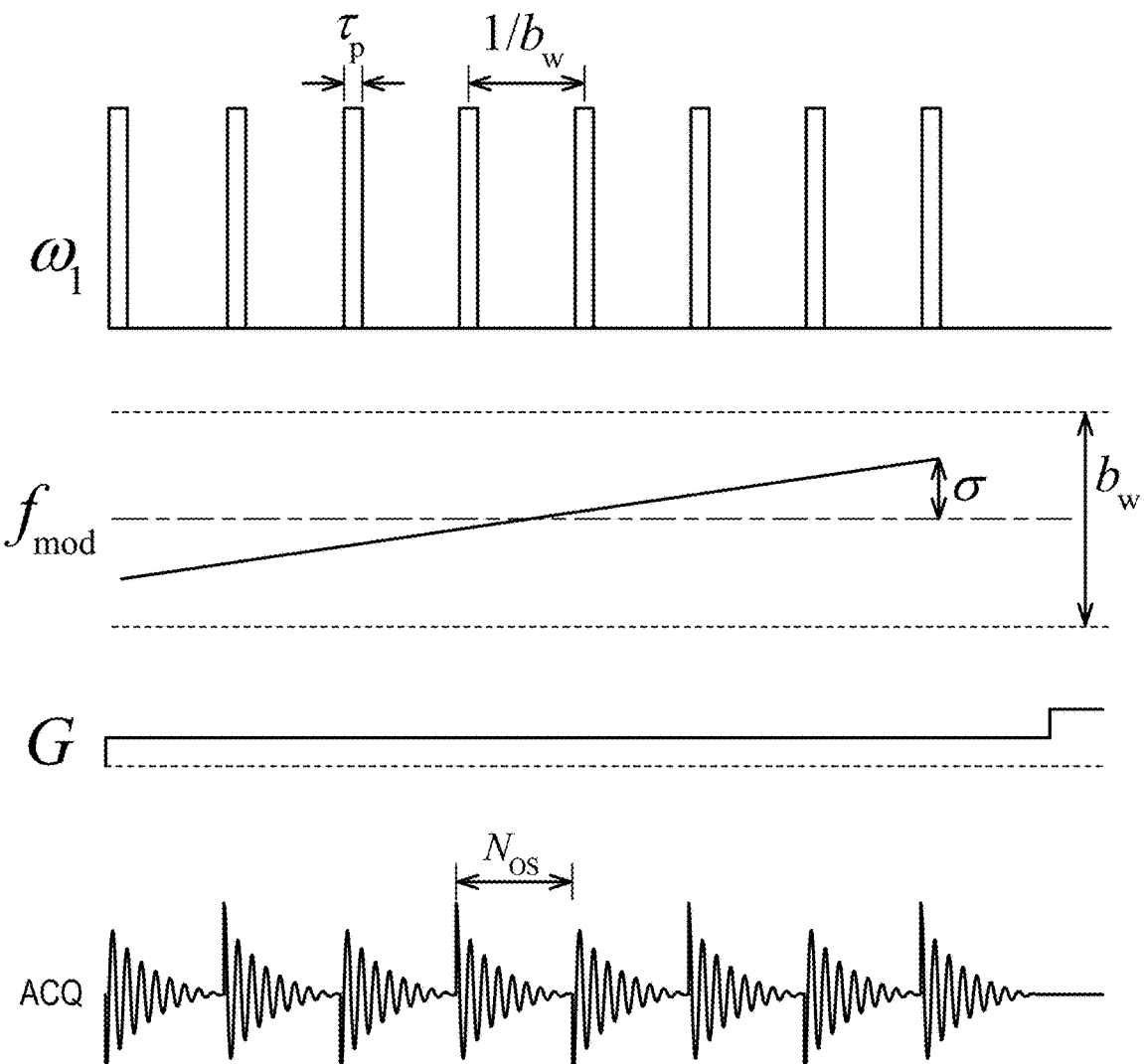
FIG. 1A is an example of one projection-block of an example pulse sequence that implements the present invention.

Functional MRI ("fMRI") has evolved to become an indispensable tool of contemporary basic and clinical biomedical research, allowing non-invasive mapping of brain function and network connectivity in both human and animal studies. Thanks to multiple technological advancements resulting from the efforts of many research groups including those of the Human Connectome effort, functional imaging of the brain is now possible at very-high spatial and temporal resolutions, with clear benefits in sensitivity to brain function.

Unfortunately, the research field of fMRI targeting the spinal cord and the inter-brain neural relations for understanding social interactions (so called hyper-scanning), is much less developed. Although recent years have seen an increasing interest in such applications thanks to technical advancements in acquisition and processing strategies, fast imaging in the spinal cord or socially interacting subjects remains challenging. In fact, susceptibility artifacts related to tissue characteristics, inhomogeneities, motion of the spinal cord or cerebrospinal fluid caused by cardiac and respiratory cycles, and the small dimension of the spinal cord all compound to compromise the quality and the spatial resolution of the images of the spine. Some have proposed that proton-weighted signal enhancement by extravascular water protons ("SEEP") acquired with spin-echo sequences and relatively short echo times can alleviate the challenges of spinal cord fMRI, as compared to the blood oxygenation level dependent ("BOLD") contrast acquired with gradient echo planar imaging ("EPI"). Yet, a consensus on the origin of the SEEP contrast and on its technical advantages does not exist at the moment for spinal cord fMRI, or for brain fMRI.

As noted above, fMRI acquisition of the brain and the spinal cord is not practical or possible in most situations. At best, only a limited number of fMRI studies combining brain and SC have been reported so far and have achieved this by performing sequential fMRI studies of the brain and then the spine, or vice versa. Moreover, such studies have generally focused on acquiring images from the midbrain regions and cervical spinal cord. So far, MRI studies have been unable to acquire full-CNS fMRI data covering the full brain and spinal cord.

As will be described, the system and methods provided herein overcome the drawbacks of prior efforts to acquire full-CNS fMRI data covering the full brain and spinal cord of one or more subjects.

Historically, when attempting to use a very-large FOV that would be suitable to span full-CNS to acquire fMRI data from both the brain and spine, field inhomogeneities undermine the data. That is, the foremost challenge of full-CNS or multi-subject ("social") fMRI originates from the fact that fMRI methodologies require high magnetic field uniformity in the FOVs of interest to avoid detrimental signal losses, and standard static shimming procedures become insufficient to handle the large range of frequency offsets when the FOV(s) needs to cover both brain and spinal cord of one or more subjects. Algorithms of per-slice dynamic shimming have been proposed, however, they considerably prolong the experimental session, they are limited by the settling-time of eddy currents, and they have been applied only to cover cervical (but not lower) spinal cord. Similar challenges were identified during hyper-scanning of two subjects in the MRI scanner. More in details, the SNR of the two-person measurements was almost 50% lower than that of the single-subject measurements, with most pronounced drop of signal in the frontal cortices of the brains. It had been shown that for dual-coil setup the second-order shim coils couldn't achieve the same degree of homogeneity for the two heads than for a single subject setup. The B0 at the edges of the large FOV is less homogeneous than in the center of the magnet.

Dynamic multi-coil shimming could ameliorate these challenges, however, it prolongs scanning time and decreases temporal resolution. Moreover, dynamic multi-coil shimming is not generally available on clinical systems, which lack the specialized gradient hardware for such methods. However, the present disclosure recognizes that some imaging techniques can be resilient to Bo inhomogeneities, even over large FOVs, and therefore do not need dedicated shimming solutions.

Furthermore, the present disclosure recognizes that simultaneous acquisition of fMRI data from the full brain and full spinal cord has substantial clinical value. That is, the present disclosure recognizes that the quantification of fMRI outcomes requires the signals to be synchronized with the task in task-based fMRI, or among different locations in resting-state fMRI for connectivity analyses. However, per-slice dynamic shimming procedures result in inefficient sequential ordering of slice acquisitions, resulting in the two regions of interest being acquired with a delay of typically 2 s or more between each FOV. In this scenario, the commonly implemented slice-time corrections, which generally work well for short repetition times ("TR"), may become inadequate to interpolate fMRI signals, especially for event related designs and connectivity analyses. Since timing corrections interact with other pre-processing steps, including motion corrections, the long delay between FOVs becomes even more problematic in the presence of different motion or noise characteristics between the brain and the spinal cord, or between brains in a two-person scenario.

Another complicating factor arises from differences in hemodynamic response functions between the two sites. An alternative methodology that enables simultaneous rather than sequential acquisitions of distant sites would be highly desirable for unbiased fMRI analyses of the CNS or two independent brains, especially in studies of spinal cord injuries or social fMRI where the relay of neuronal signals may be compromised and thus disrupt connectivity.

To overcome these shortcomings, the present disclosure provides systems and methods for acquiring MRI data from multiple FOVs simultaneously. As will be described, the systems and methods provided herein are not limited to a particular pulse sequence but may use any of a variety of pulse sequences, including zero-echo time ("ZTE") pulse sequences (including those referred to as RUFIS or PETRA), and ultra-short echo time (UTE) pulse sequences. Thus, in one non-limiting example, the present disclosure may use sweep imaging with Fourier transformation ("SWIFT") or multi-band sweep imaging with Fourier Transformation ("MB-SWIFT") pulse sequence but is not limited to SWIFT/MB-SWIFT.

MB-SWIFT can detect brain activation in human studies and provides numerous technical benefits for studying the function of the brain and spinal cord, separately. As opposed to standard fMRI approaches, MB-SWIFT is resilient to Bo inhomogeneities and susceptibility artifacts. Even without the use of dedicated shimming solutions, MB-SWIFT can image two different FOVs at distant CNS locations, such as brain and lumbar spinal cord, in a true simultaneous fashion (i.e., within 1 ms of each other). This is achieved, in part, due to the radial acquisition scheme used in MB-SWIFT. Furthermore, radial acquisition allows unaliased sampling and removal of physiological noise within individual spokes, and it allows high spatial resolution in smaller FOVs as oversampling can be performed in the readout direction without acquisition time penalty.

MB-SWIFT measures 3D coverage of the brain without producing an echo. MB-SWIFT achieves high excitation and acquisition bandwidths in all encoding directions in a power efficient manner that enables obtaining optimally high flip angles for fMRI. On the other hand, ultra-short echo time (UTE) could easily achieve optimal flip angles. UTE has been used for fMRI; however, noisy functional time-series were measured, and the results have not been reproduced. The challenge of obtaining robust fMRI time-courses likely involves performance inefficiencies at high bandwidths due to ramp-up gradient limitations.

Imaging with virtually no echo time and high bandwidth via MB-SWIFT offers the distinct benefit of inherently minimizing sensitivity to BO inhomogeneities. The present disclosure recognizes that this can be advantageously exploited for CNS fMRI or two-person hyper-scanning, because it enables circumventing the challenges of shimming large FOVs, and it reduces or minimizes sensitivity to both motion and signal dropouts due to susceptibility artifacts, which are particularly prominent in spinal cord imaging or two-person social fMRI.

The present disclosure recognizes that the radial acquisition implemented in MB-SWIFT offers additional benefits for CNS or social fMRI. It allows temporally unaliased sampling and removal of physiological noise within individual spokes, and it enables high spatial resolution in smaller FOVs as oversampling can be applied in the readout direction along with subsequent over-gridding during image reconstruction to minimize folding artefacts without acquisition time penalty. Furthermore, with radial acquisitions, sampling of two FOVs can occur with a time-shift of a single spoke duration (i.e., within 1 ms of each other), and the center of k-space, critical for detecting fMRI signals, is consistently sampled in each spoke for each FOV. Overall, the present disclosure provides systems and methods for a true simultaneous acquisition of two FOVs, the spatial resolutions of which can be optimized separately, for example, for brain and spinal cord or for two-brain coverage. This result is unattainable with conventional fMRI cartesian readouts. Finally, the present disclosure recognizes that the gradients can be slowly switched, which is viable using MB-SWIFT, to control or minimize gradient-induced artefacts during electrophysiological recordings (ER), along with a nearly silent acoustic noise that increases the comfort of the subject.

The present disclosure can acquire MRI data from two or more sites without the need of dedicated shimming solutions. The sites may be distant or separated in space. For example, MRI data may be acquired from two different locations of the CNS, such as the brain and the spinal cord. Other distant organs may also be imaged, such as heart, kidneys, and liver. More particularly, the present disclosure provides systems and methods for using a coil with multiple FOVs (e.g., in a parallel transmit configuration) and/or multiple RF coils controlled for simultaneous acquisition. For example, one can use either a parallel transmit (interleaved) or dual coils (simultaneously) to acquire MRI data of the full brain and the full spinal cord, or two brains separately.

The MRI data may include functional MRI (fMRI) data, but may not include fMRI data and may include other MRI data. Using the disclosed system and methods, the fMRI time course data may be acquired simultaneously from the multiple FOVs. Moreover, the MRI data may include structural or anatomical images or quantitative MRI data acquired from multiple FOVs. In this case, the system and methods may advantageously provide higher signal to noise ratio as compared to standard methods. As a non-limiting example, the data may include angiography, which may advantageously be acquired simultaneously from two FOVs.

The systems and methods provided herein can detect and remove physiological noise at the spoke (i.e., ms) temporal scale and motion at sub-volume (i.e., 100 ms) temporal scale, which allows for noise removal, as typically used for clinical use of brain and spinal cord fMRI. The present disclosure also provides systems and methods for simultaneous implementation of MB-SWIFT fMRI with electrophysiological recordings (ER) in the spinal cord. Further still, the systems and methods provided herein allow for social fMRI investigations during hyper-scanning with two subjects positioned together in the magnet bore and undergoing simultaneous fMRI acquisition.

The present disclosure recognizes that MB-SWIFT has many features that can advantageously be used for fMRI. First, because the gradients are generally on and only the projection orientation is incremented in consecutive repetitions (TR), scanning can be close to inaudible, and artefacts induced by gradient switching are minimized during electrophysiological recordings. Second, imaging of extremely fast relaxing spins is possible, which makes MB-SWIFT suitable for capturing signals from spins with low mobility and/or spins experiencing high magnetic field inhomogeneity. Accordingly, brain areas affected by large susceptibility gradients can be studied, such as near sinuses or close to metallic implants such as the electrodes used for ER. Also, multiband excitation allows covering a large BW, while using relatively small RF amplitude. Further still, high bandwidths allow decreased acquisition time and subsequent increased temporal resolution. In addition, even as a 3D acquisition method MB-SWIFT has the advantage of being a fast acquisition method since no time is used for turning on and off gradients. Also, without echo, high-BW, MB-SWIFT is less sensitive to motion than conventional gradient echo or spin echo pulse sequences for MRI. Furthermore, like other radial acquisition methods, MB-SWIFT can be operated to reach ultra-high temporal resolution. High pseudo-temporal resolution is possible because the center of k-space is sampled with every projection. In addition, using a sequence such as MB-SWIFT with virtually zero echo-time allows excluding T2 effects while keeping T1 dependencies, in contrast to conventional BOLD methods. With this in mind, it is possible that a proportion of T1-mechanisms in MB-SWIFT fMRI has a tissue origin and is directly sensitized to neuronal events, although previous evidence is consistent with the majority of functional contrast still being driven by hemodynamic in both brain and spinal cord. Therefore, the present disclosure recognizes that MB-SWIFT can be used for fMRI to target the contrast origin, and even include a contribution of extravascular water protons for the SEEP contrast.

MB-SWIFT is a three-dimensional radial MRI pulse sequence with large excitation and acquisition bandwidths, practically zero echo time, and minimal gradient switching steps during data acquisition. MB-SWIFT efficiently uses transmitter power and has increased sensitivity as compared to other techniques used for imaging of fast relaxing spins. Thus, the methods described here are less restricted by MRI system hardware. MB-SWIFT is also capable of achieving higher flip angles than are achievable with sequences such as ZTE while using the same scanning parameters (e.g., bandwidth, acquisition time, RF pulse amplitude). Additionally, MB-SWIFT can provide information about both fast and slow relaxing spins in a single scan. These features are advantageous for numerous MRI applications, including musculoskeletal imaging. The MB-SWIFT imaging technique can be utilized for traditional MRI, in which hydrogen nuclei are imaged; however, it can also be readily adapted to image other nuclear species, including, for example, phosphorous, sodium, and so on.

As an example, the systems and methods described here can implement a frequency swept excitation technique referred to as sweep imaging with Fourier transformation ("SWIFT") and described in U.S. Pat. No. 7,403,006, which is herein incorporated by reference in its entirety. A frequency swept excitation is achieved by exciting nuclear spins using a radio frequency ("RF") sweep. In some configurations, the RF excitation includes a series of pulses, each pulse having an excitation segment and a quiescent segment. The frequency or phase is then swept within each of these pulses. A signal is acquired as a time domain signal during the quiescent segment of each pulse. The acquired signal is treated as a signal that varies as a function of time and is processed in the time domain. After signal acquisition, the signal is processed, for example using a correlation method or a convolution, to correct the acquired signal by separating the spin system spectrum. The processed signal can then be used to reconstruct an image of the underlying object or subject. Generally, the method provides for fast and quiet MRI. Standard MRI scanners, such as those described below, may be programmed to use the frequency swept excitation technique.

A multiband excitation can be used to cover a larger excitation bandwidth, while using relatively small average power. In the presence of the readout gradient, the MB-SWIFT excitation excites a striped projection. The multiband excitation allows flexible manipulation of the amplitude and width of excited sidebands. Similar to SWIFT, in MB-SWIFT the acquisition occurs during the excitation, which makes this sequence sensitive to short $T_2$s. The MB-SWIFT sequence yields increased sensitivity and reduced power deposition relative to other methods at high bandwidth, and additionally allows analysis of $T_2$ distributions.

In general, the swept frequency excitation includes a plurality of sub-pulses that are spaced apart by a pulse interval, $\Delta t$, and each sub-pulse has a width, $\tau_p$. When the pulse widths are much shorter than the pulse interval, then the excitation is approximately equivalent to the superposition of a number of weak selective RF pulses with frequencies that are spaced $b_w=1/\Delta t$ Hz apart, which may also be referred to as the width of a nominal baseband. The excitation can thus be viewed as including the excitation of these "sidebands," which are symmetrically disposed with respect to the transmitter frequency at $v_0$, $v_0+b_w$, $v_0+2b_w$, and so on. For spins whose resonance frequency is close to one of these sideband conditions, the MB-SWIFT excitation acts like a weak selective pulse.

FIG. 1A schematically illustrates one projection-block of an example MB-SWIFT pulse sequence. In this example, a chirp pulse is used and only the gradient, G, orientation is changed from projection to projection. In contrast to a traditional SWIFT pulse, fewer gaps, $N_G$, are used in this example, thereby greatly reducing the transmitter duty cycle, $$d_c = \tau_p b_w \quad (1).$$

To deliver a multiband property, the sequence may contain at least two pulses (i.e., $N_G > 1$) applied in the presence of the same magnetic field gradient. In some configurations, a higher oversampling value, $N_{OS}$, which is equal to the number of samples in each gap, can be implemented. The amplitude of the frequency modulation, a, in MB-SWIFT is variable in the range $0 \leq \sigma \leq b_w/2$. In original SWIFT, the frequency modulation is usually fixed and equal to $b_w/2$.

The gapped excitation illustrated in FIG. 1A creates sidebands with amplitudes, $$A_m = \text{sinc}(md_c) \quad (2);$$

where m is the sideband order. MB-SWIFT uses sidebands for the excitation of the imaged object. In one implementation of MB-SWIFT, the width of a nominal baseband, $b_w$, is matched to the linear width of the voxel (in frequency units). Thus, the matrix size, N, will be equal to number of sidebands covering the linear size of the FOV, and $N = N_{OS}$.

Figure 1B:
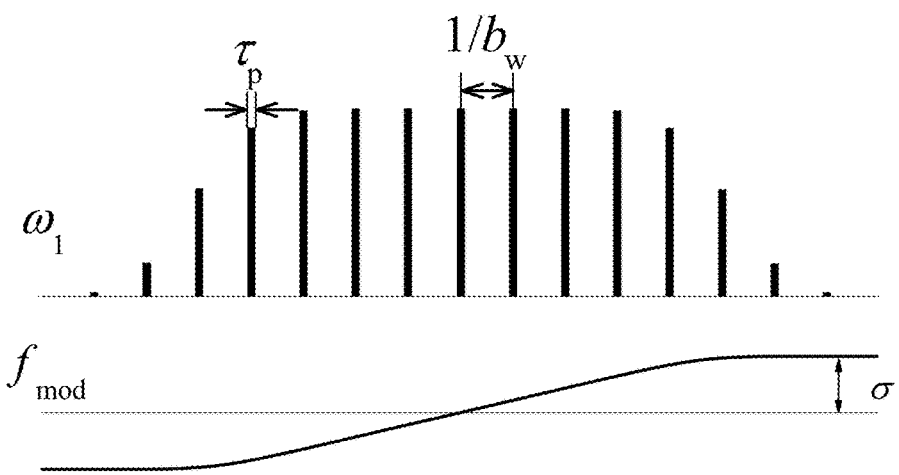
FIG. 1B is an example of an alternative sweeping frequency excitation that can be used in the projection-block of FIG. 1A.

It will be appreciated by those skilled in the art that frequency modulations, $f_{mod}$, other than the one illustrated in FIG. 1A can be used to create frequency-modulated pulses. For instance, as illustrated in FIG. 1B, a stretched hyperbolic secant ("HSn") frequency-modulated pulse can also be used. In the particular example of FIG. 1B, an HS4-type frequency-modulated pulse is shown. As seen in this example, the envelope of the excitation pulses does not need to be rectangular, as is the one in FIG. 1A; instead, any suitable pulse envelope can be used.

Figure 2:
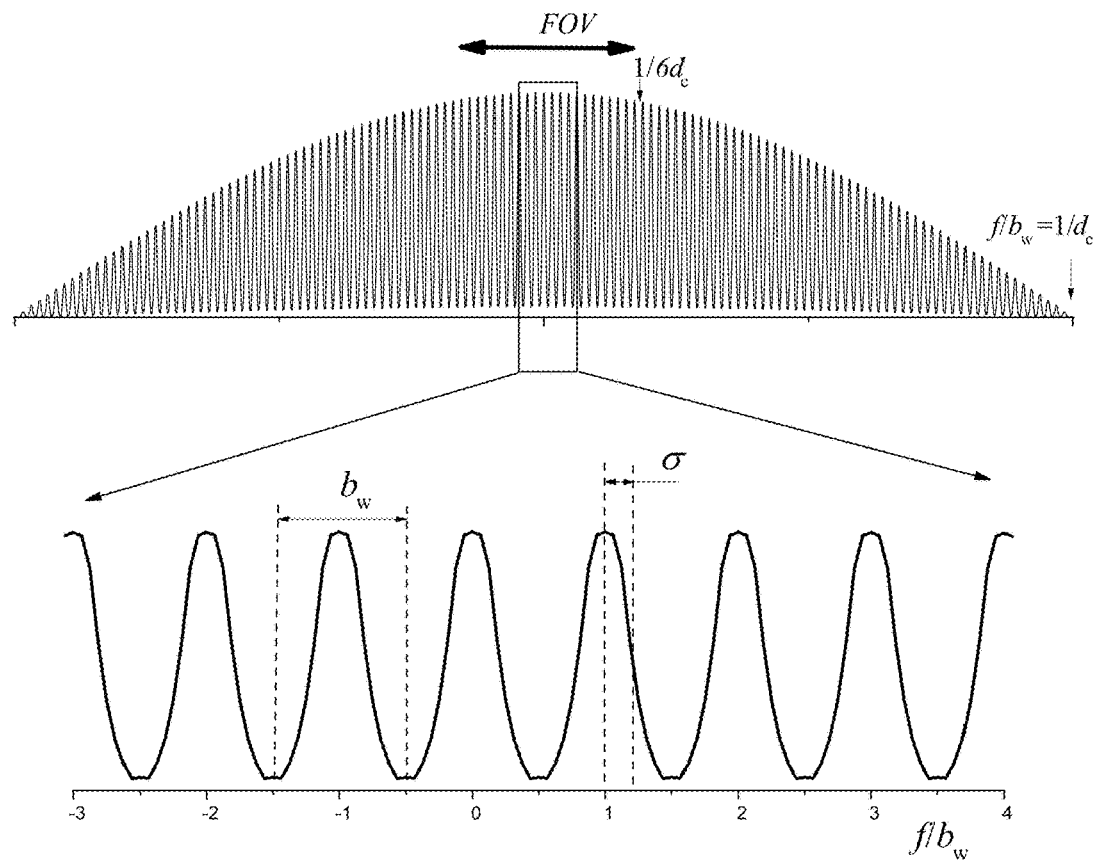
FIG. 2 is an example of a frequency excitation profile that can result in some implementations of the present invention.

FIG. 2 represents the magnitude of an example gapped excitation profile. The example in FIG. 2 is for the case where $\sigma < b_w/2$ when the profile looks like a comb. The abscissa is frequency normalized by $b_w$. The integer part of $f/b_w$ is equal to the corresponding sideband's order, m.

According to Eqn. (2), in this example the sideband amplitudes are $A_m=0$ when the sideband order $m=\text{int}(1/d_c)$.

For imaging applications generally, and especially for steady state imaging applications, it may be important to keep the excitation as uniform as possible throughout the FOV. For instance, in the case of a square hard pulse, the desirable excitation bandwidth, which should be matched with the FOV with less than five percent falloff at the edges of the bandwidth, may be equal to ⅓ of the inversed length of the pulse. In practical implementations of the sequence, due to limited RF amplitude, this requirement is frequently violated in order to increase the flip angle. With MB-SWIFT, however, the flip angle can be increased without violating this requirement. Accordingly, in the case of MB-SWIFT, the sub-pulse duration, $\tau_p$, can be chosen as $\tau_p=1/(3Nb_w)$. In this case the maximum sideband order is equal to $m_{max}=\text{int}(1/(6d_c))$, which defines the edges of FOV, as shown in FIG. 2.

It can therefore be seen that MB-SWIFT does not excite an object continuously, but excites bands, or strips, in or across the object. The width of the excitation strips is selected to be equal to or smaller than the linear size of a voxel in the final image of the object, and thus can be regulated by the relationship between a and $b_w$. Due to the uncertainty principle, the width of strips could not be smaller than $1/T_p$, where $T_p=N_G/b_w$ is a total pulse length. As a result, the fraction of the excited part of a voxel, $\rho$, could be estimated as, $$\rho = \frac{\left(2\sigma + \frac{b_w}{N_G}\right)}{b_w} = \frac{\left(\frac{2\sigma N_G}{b_w}+1\right)}{N_G}. \quad (3)$$

Thus, the smallest excited fraction is determined by $1/N_G$ when $\sigma=0$.

After acquisition, the time domain response signal, r(t), is Fourier transformed ( $\Im\{r(t)\}\to R(\omega)$) and correlated with the pulse function, x(t), in the frequency domain ( $\Im\{x(t)\}\to x(\omega)$) with complex conjugate multiplication by the pulse function, $$H(\omega) = \frac{R(\omega)X^*(\omega)}{|X_R(\omega)|^2}. \quad (4)$$

In difference from the original SWIFT method, here the normalization by $|X(\omega)|$ is replaced by a regularized argument to avoid the noise amplification between the sidebands. After that, the signal is inverse Fourier transformed and chopped after the first $N_{OS}$ samples. In some other embodiments, such as those described below, the first $N_{SR}N_{OS}$ samples are kept. This down sampling procedure yields the desired spoke in k-space, which in the frequency domain presents the average amplitudes of excited bands in the simplest case of one point per stripe along the projection.

Figure 3:
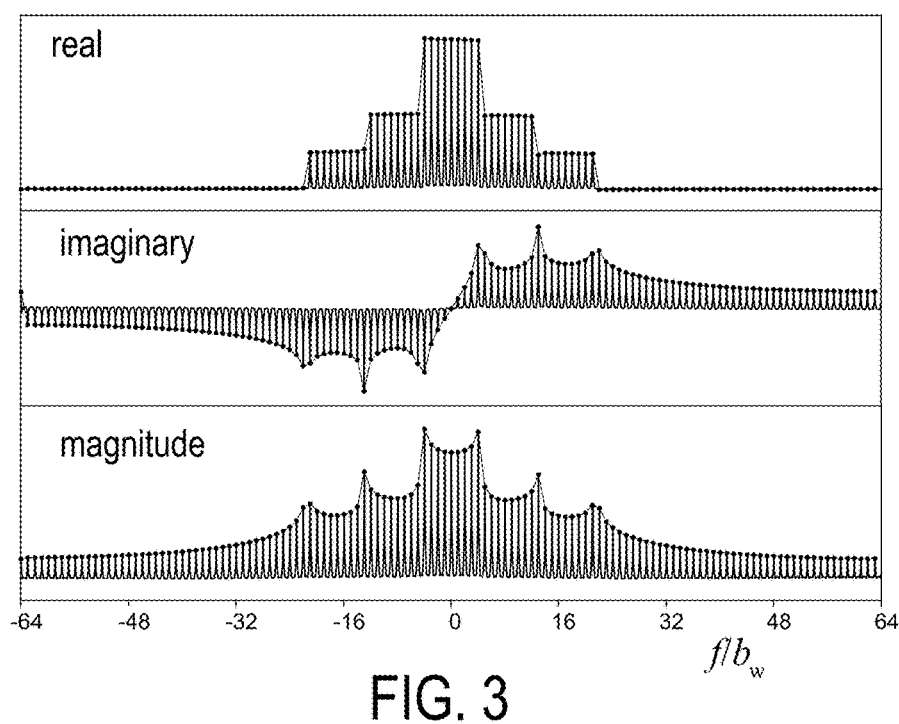
FIG. 3 is an example of a simulated object imaged in accordance with some embodiments of the present invention.

Simulated MB-SWIFT data and the corresponding strip-averaged projection of a stepped object are presented in FIG. 3. In actual implementations, the few first samples under RF pulse and coil ring down time may be missed and could be predicted based on good points or measured during a separate experiment that could be carried out with lower bandwidth, such as with some other ZTE approaches like PETRA. After this procedure, the down-sampled k-space data are used for the reconstruction of the image. As one example, gridding can be used for reconstruction, but any other radial reconstruction scheme could similarly be utilized, as can other algebraic reconstruction techniques.

Usually, increasing the spatial resolution in an imaging application requires increasing the acquisition time, which makes sampling of fast decaying components less optimal. The spatial resolution in the MB-SWIFT sequence described above was determined by the number of samples, $N_{OS}$, in the gaps, which was equal to the matrix size $N=N_{OS}$. The sub-voxel excitation in the case of MB-SWIFT, however, includes additional spatial information that can be used to enhance the spatial resolution without increasing the acquisition time.

Figure 4:
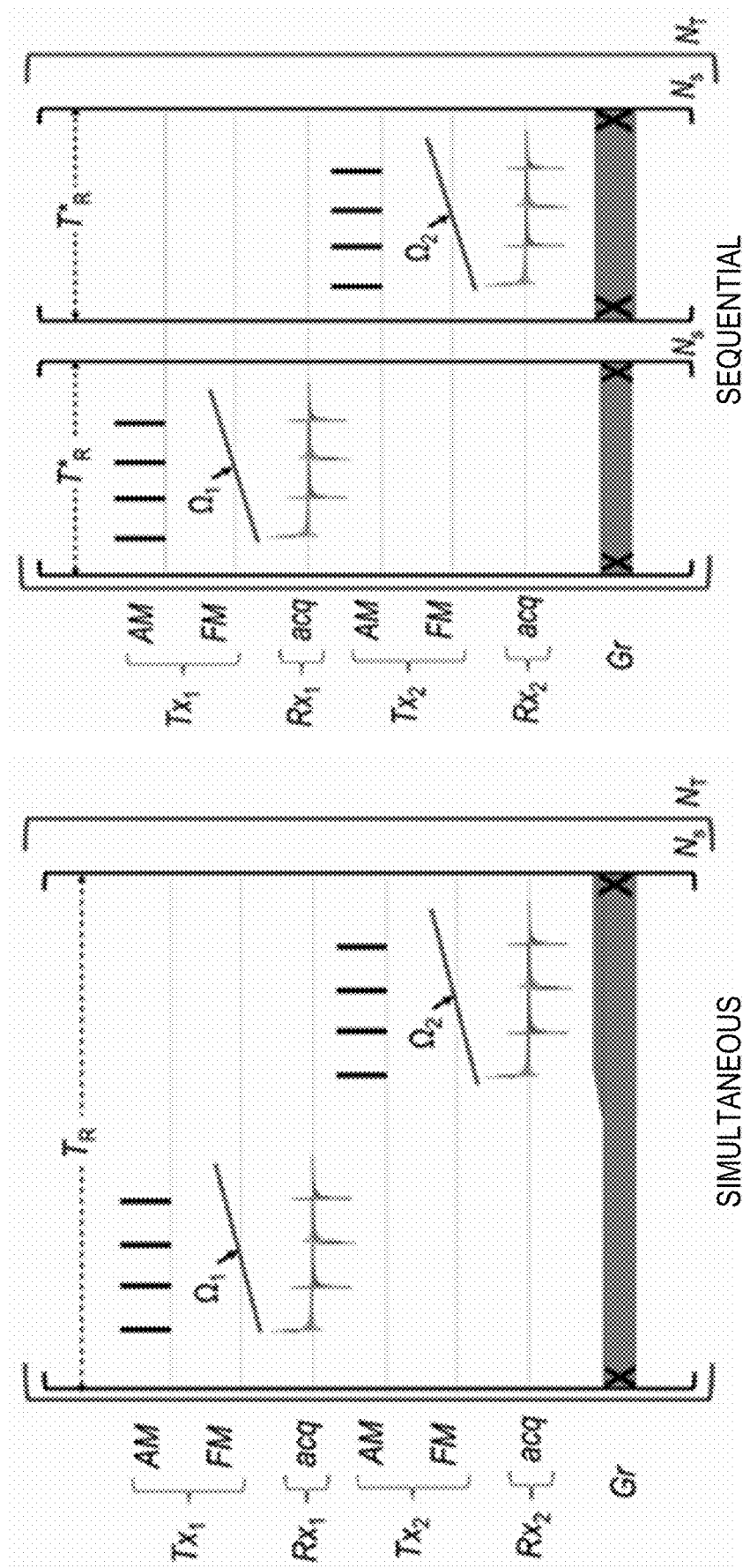
FIG. 4 is a set of schematics of a dual-FOV, MB-SWIFT pulse sequence, for simultaneous acquisitions and sequential acquisitions.

Referring now to FIG. 4, a schematic is provided showing the MB-SWIFT pulse sequence utilized for simultaneous imaging of two FOVs excited by two different coils and also a sequential imaging of two FOVs excited by two different coils. In this way the FOVs can be separate and distinct, that is, non-overlapping. The labels and parameters used in FIG. 4 are $T_R$ and $T^*_R$ for repetition times, $N_S$ for the number of spokes, NT for the number of time points, AM for amplitude modulation function, FM for frequency modulation function, $T_{X1}$ and $T_{X2}$ for transmitting channels, $R_{X1}$ and $R_{X2}$ for receiving channels, $\Omega_1$ and $\Omega_1$ for transmitter's frequency offsets, αcq for acquisition, Gr for field gradients, and X for the gradient orientation changing event. Non-linear gradients may be used to cancel out spins outside of the FOV.

As in regular MB-SWIFT methods, the gradient incrementally changes orientation from spoke to spoke. However, with the simultaneous version, as shown in FIG. 4, during one gradient orientation, two FOVs radiated by two different RF coils are sequentially excited. Acquisition is then repeated $N_s$ times for the other gradient directions. Thus, the dual FOV volume is acquired with $N_S T_R$ time resolution.

On the other hand, with the sequential version, each even time point refers to the first FOV and each odd time point to the second FOV. Each FOV is acquired within $N_S T^*_R$. Thus, the two FOVs are acquired within $2N_S T^*_R$. Since $T^*_R=T_R/2$, the fMRI time resolution of the dual FOV remains identical for simultaneous and sequential acquisitions. The offset frequencies of the transmitters ($\Omega_1$ and $\Omega_2$) change according to the gradient orientation and the FOV positions. The gradient is shown in FIG. 4 by the bar labeled with "Gr" and can be slightly increased for the second FOV as compared to the first FOV, representing the case of different sizes of FOVs, requiring the different readout gradient amplitudes.

The number of gaps (shown in a non-limiting example as equal to 4 in FIG. 4) can be increased to gain SNR and power efficiency, or decreased for faster imaging. Although the coupling between the coils is small due to the distant (bigger than coil radius) location of the two coils, and only small residual artefacts were observed in testing data, active decoupling can be implemented to further optimize the isolation of the two coils. If two completely decoupled coils are available, e.g., actively or geometrically decoupled, it is possible to acquire signal from the two coils completely simultaneously provided that the console can deliver multiple excitation frequencies. Moreover, the Tx1 and Tx2 may be advantageously independent. However, even in a simplified setup where Tx1 and Tx2 are derived from a single Tx in conjunction with a quadrature hybrid splitter as power splitter, good quality fMRI maps can be produced. Finally, since $T_R=2 T^*_R$, with the simultaneous acquisition the Ernst flip angle and the SNR increase by a factor of ~√2 as compared to the sequential acquisition. Due to this benefit, the simultaneous acquisition shows the advantages described herein, for example, over the sequential version.

EXAMPLES

MB-SWIFT fMRI has been demonstrated to reliably detect brain activation changes in visual stimulation in humans, in deep brain stimulation (DBS), in resting state fMRI, and in behaving rats. As opposed to conventional EPI, MB-SWIFT allows for robust detection of activation in the spinal cord during epidural spinal stimulation. Yet, the opportunity to image functional activity in the full brain and full spinal cord simultaneously has not been achieved so far. Pilot data obtained in 3 rats demonstrated that MB-SWIFT with a dual coil and a dual FOV provides simultaneous artefact-free images of brain and spinal cord at temporal resolutions compatible with fMRI designs, even without introducing dedicated shimming solutions.

Referring to FIGS. 5A-5D, the acquisition strategy and results from the pilot data acquisition are illustrated. Pilot data include dual FOV MB-SWIFT fMRI and single FOV EPI fMRI in brain and lumbar spinal cord during hind paw stimulation. The Sprague Dawley rat (aged ~3 months) was anaesthetized with isoflurane and medetomidine. Respiration rate and body temperature were monitored during all MRI scans. MB-SWIFT acquisition with dual-FOV with simultaneous set-up was obtained with 1547 views, flip angle 6°, repetition time (TR)=3 s, 300 repetitions, FOV 35×35×35 mm$^3$. For the data analysis, images were separately (brain and spinal cord) corrected for motion using FSL mcflirt function. The signal time-courses of the image voxels were subjected to standard general linear model in SPM to find "activated voxels", i.e., voxels whose timecourse correlated to the stimulation paradigm timing convoluted with an impulse response function.

Figures 5A, 5B, 5C, 5D:
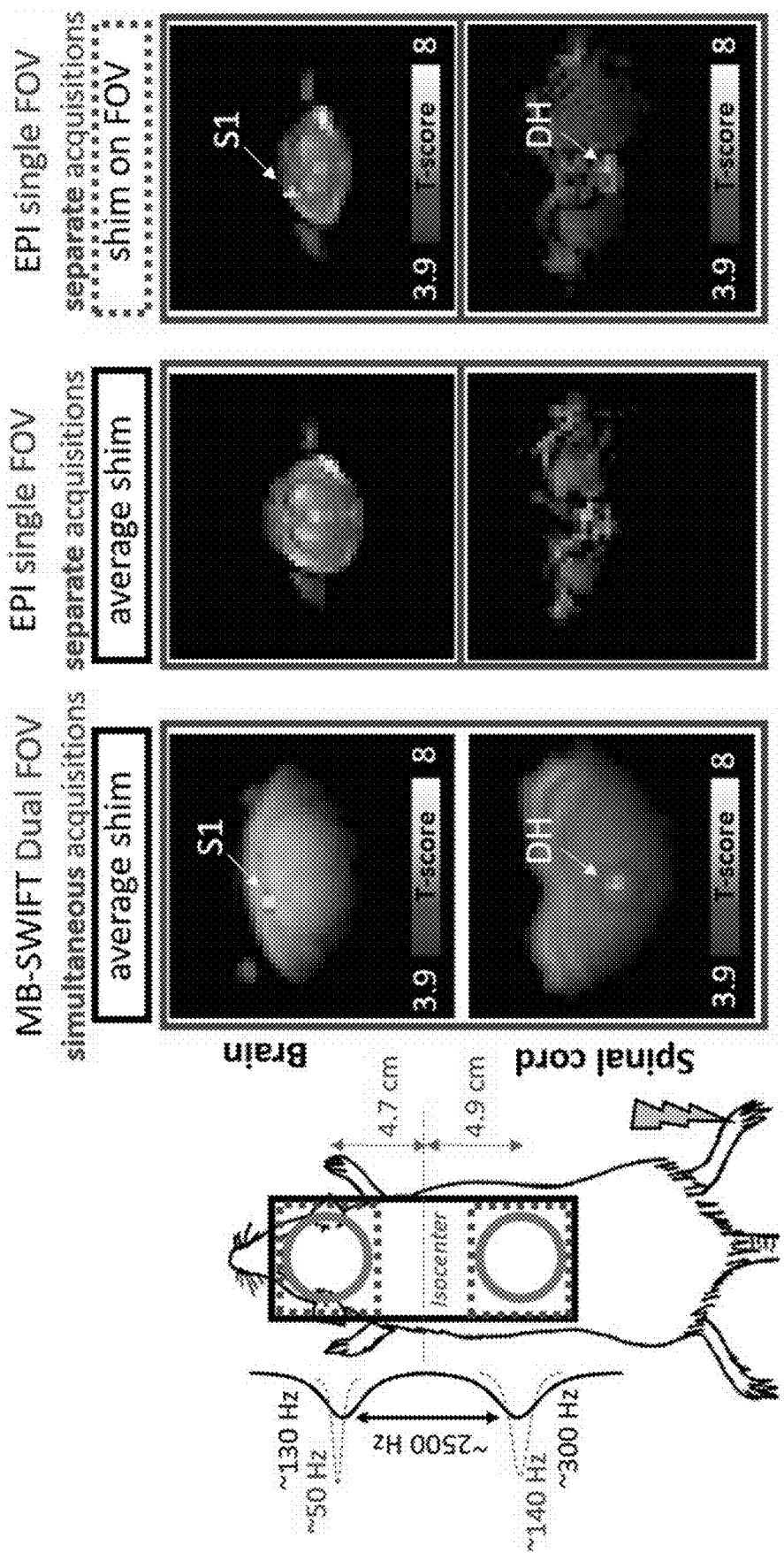
FIG. 5A is an illustration of an experimental imaging configuration showing the dual-FOV application applied to a rodent imaging application.
FIG. 5B is an example of images acquired with a dual-FOV, MB-SWIFT simultaneous acquisition.
FIG. 5C is an example of images acquired with a single-FOV, EPI sequential acquisition with an average shimming.
FIG. 5D is an example of images acquired with a single-FOV, EPI sequential acquisition with a shimming on the each FOV.

In FIG. 5A, the dual coil locations and shimming areas (solid line for average shim across the two FOVs, and dashed lines for FOV-specific shimming) are illustrated. Typical, linewidths obtained with these shimming procedures are also shown. Note that a double line is observed with dual FOV. Even in absence of FOV-specific shims, MB-SWIFT provides undistorted and clean images in FIG. 5B and allows detection of the expected activations in contralateral primary somatosensory cortex (S1) and ipsilateral dorsal horn (DH) at L4 spinal level. Simultaneous dual FOV acquisitions are not practical with EPI, and nor are sequential acquisitions in absence of dynamic shimming solutions. Thus, only separate single FOV EPI with single coil are shown for comparison. When using shim averaged across the two FOVs, as shown in FIG. 5C, EPI images are highly distorted and noisy, preventing fMRI detection. With shim on each FOV, as shown in FIG. 5D, activations could be detected in both brain and spinal cord with EPI. T-score=3.9 corresponds to p<7e-05, uncorrected for multiple comparisons.

Referring to FIGS. 5A-5D, robust and specific activations were detected in both brain and spinal cord during a hind paw stimulation paradigm, whereas EPI failed to produce images of acceptable quality for fMRI analyses when using averaged shims across the two FOVs. To achieve further sensitivity, one can first optimize the design of the RF coil for covering the full brain and full spinal cord. Next, the acquisition parameter space can be optimized for fMRI sensitivity in both full brain and full spinal cord coverage without introducing dedicated shimming algorithms.

As another non-limiting example, the setup shown in FIG. 5A can be used to acquire fMRI data from two or more subjects simultaneously. For example, a FOV can be defined for a brain region for each subject. Such a setup can be used for hyper-scanning fMRI of socially interacting awake animals and humans.

Figure 6:
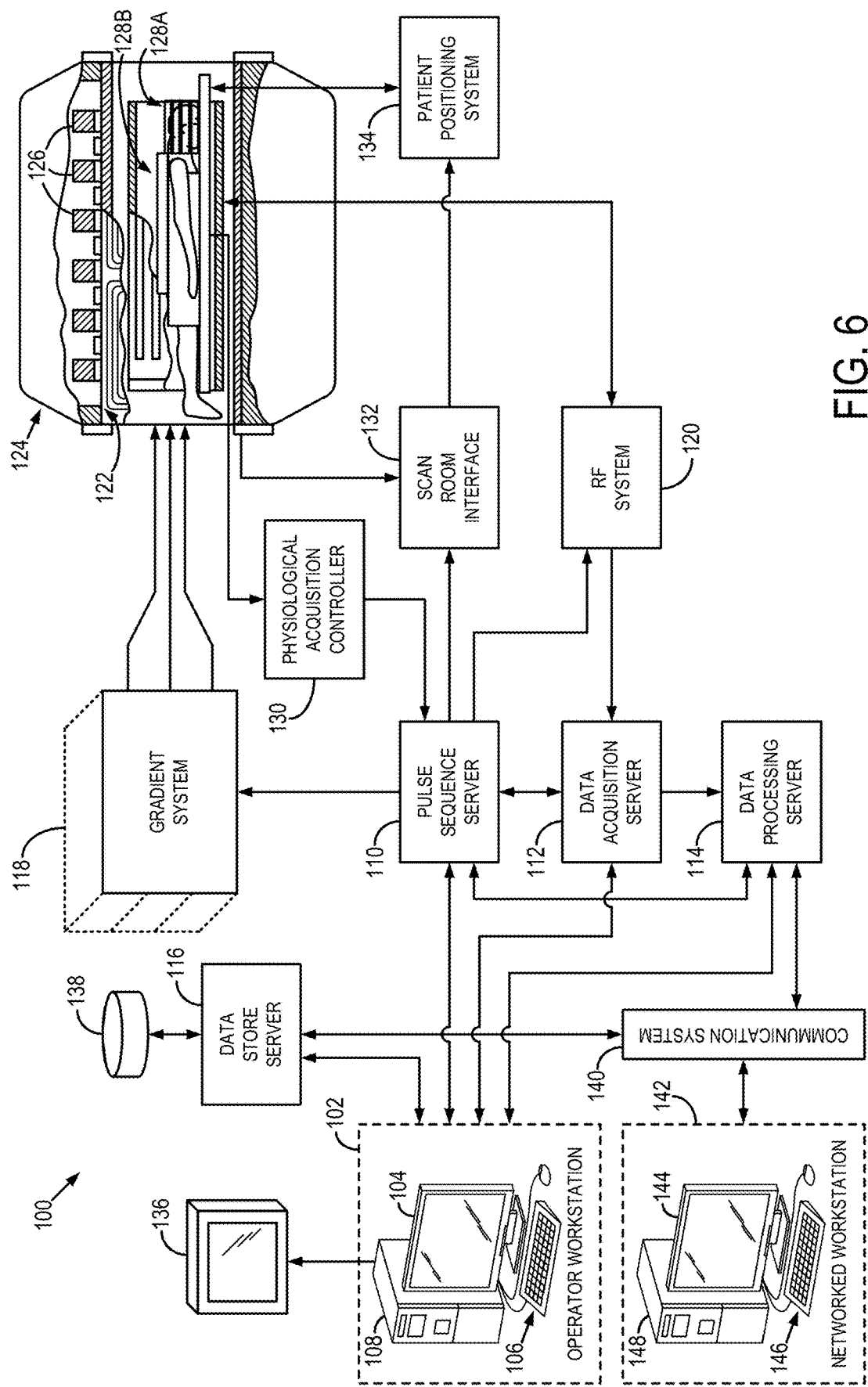
FIG. 6 is a block diagram of an example of a magnetic resonance imaging ("MRI") system.

Referring now to FIG. 6, an example of a magnetic resonance imaging ("MRI") system 100 for implementing the systems and methods with human imaging subjects or patients is illustrated. The MRI system 100 includes an operator workstation 102, which will typically include a display 104; one or more input devices 106, such as a keyboard and mouse; and a processor 108. The processor 108 may include a commercially available programmable machine running a commercially available operating system. The operator workstation 102 provides the operator interface that enables scan prescriptions to be entered into the MRI system 100. In general, the operator workstation 102 may be coupled to four servers: a pulse sequence server 110; a data acquisition server 112; a data processing server 114; and a data store server 116. The operator workstation 102 and each server 110, 112, 114, and 116 are connected to communicate with each other. For example, the servers 110, 112, 114, and 116 may be connected via a communication system 140, which may include any suitable network connection, whether wired, wireless, or a combination of both. As an example, the communication system 140 may include both proprietary or dedicated networks, as well as open networks, such as the internet.

The pulse sequence server 110 functions in response to instructions downloaded from the operator workstation 102 to operate a gradient system 118 and a radiofrequency ("RF") system 120. Gradient waveforms necessary to perform the prescribed scan are produced and applied to the gradient system 118, which excites gradient coils in an assembly 122 to produce the magnetic field gradients $G_X$, $G_Y$, and $G_Z$ used for position encoding magnetic resonance signals. The gradient coil assembly 122 forms part of a magnet assembly 124 that includes a polarizing magnet 126 and a one or more RF coils 128A and 128B providing at least two FOVs. That is, though two distinct local coils 128A, 128B are illustrated, it is contemplated that a single coil system that provides two FOVs may also be utilized, such as a parallel transmit (pTx) system.

RF waveforms are applied by the RF system 120 to the RF coil(s) 128A/128B, or a separate local coil (not shown in FIG. 6), in order to perform the prescribed magnetic resonance pulse sequence. Responsive magnetic resonance signals detected by the RF coil 128A/128B are received by the RF system 120, where they are amplified, demodulated, filtered, and digitized under direction of commands produced by the pulse sequence server 110. The RF system 120 includes an RF transmitter for producing a wide variety of RF pulses used in MRI pulse sequences. The RF transmitter is responsive to the scan prescription and direction from the pulse sequence server 110 to produce RF pulses of the desired frequency, phase, and pulse amplitude waveform. The generated RF pulses may be applied to the whole-body RF coil or to one or more local coils or coil arrays 128A/128B. As described herein, the one or more local coils or coil arrays 128A/12B provide at least two FOVs that are simultaneously acquired. As such, using the systems and methods described herein, images for each FOV can be reconstructed that are temporally registered with each other.

The RF system 120 also includes one or more RF receiver channels. Each RF receiver channel includes an RF preamplifier that amplifies the magnetic resonance signal received by the coil 128A/128B to which it is connected, and a detector that detects and digitizes the I and Q quadrature components of the received magnetic resonance signal. The magnitude of the received magnetic resonance signal may, therefore, be determined at any sampled point by the square root of the sum of the squares of the I and Q components:

$$M=\sqrt{I^2+Q^2} \quad (5);$$

and the phase of the received magnetic resonance signal may also be determined according to the following relationship:

$$\varphi = \tan^{-1}\left(\frac{Q}{I}\right). \quad (6)$$

The pulse sequence server 110 also optionally receives patient data from a physiological acquisition controller 130. By way of example, the physiological acquisition controller 130 may receive signals from a number of different sensors connected to the patient, such as electrocardiograph ("ECG") signals from electrodes, or respiratory signals from a respiratory bellows or other respiratory monitoring device. Such signals are typically used by the pulse sequence server 110 to synchronize, or "gate," the performance of the scan with the subject's heart beat or respiration.

The pulse sequence server 110 also connects to a scan room interface circuit 132 that receives signals from various sensors associated with the condition of the patient and the magnet system. It is also through the scan room interface circuit 132 that a patient positioning system 134 receives commands to move the patient to desired positions during the scan.

The digitized magnetic resonance signal samples produced by the RF system 120 are received by the data acquisition server 112. The data acquisition server 112 operates in response to instructions downloaded from the operator workstation 102 to receive the real-time magnetic resonance data and provide buffer storage, such that no data is lost by data overrun. In some scans, the data acquisition server 112 does little more than pass the acquired magnetic resonance data to the data processor server 114. However, in scans that require information derived from acquired magnetic resonance data to control the further performance of the scan, the data acquisition server 112 is programmed to produce such information and convey it to the pulse sequence server 110. For example, during prescans, magnetic resonance data is acquired and used to calibrate the pulse sequence performed by the pulse sequence server 110. As another example, navigator signals may be acquired and used to adjust the operating parameters of the RF system 120 or the gradient system 118, or to control the view order in which k-space is sampled. In still another example, the data acquisition server 112 may also be employed to process magnetic resonance signals used to detect the arrival of a contrast agent in a magnetic resonance angiography ("MRA") scan. By way of example, the data acquisition server 112 acquires magnetic resonance data and processes it in real-time to produce information that is used to control the scan.

The data processing server 114 receives magnetic resonance data from the data acquisition server 112 and processes it in accordance with instructions downloaded from the operator workstation 102. Such processing may, for example, include one or more of the following: reconstructing two-dimensional or three-dimensional images by performing a Fourier transformation of raw k-space data; performing other image reconstruction algorithms, such as iterative or backprojection reconstruction algorithms; applying filters to raw k-space data or to reconstructed images; generating functional magnetic resonance images; calculating motion or flow images; and so on.

Images reconstructed by the data processing server 114 are conveyed back to the operator workstation 102 where they are stored. Real-time images are stored in a data base memory cache (not shown in FIG. 6), from which they may be output to operator display 112 or a display 136 that is located near the magnet assembly 124 for use by attending physicians. Batch mode images or selected real time images are stored in a host database on disc storage 138. When such images have been reconstructed and transferred to storage, the data processing server 114 notifies the data store server 116 on the operator workstation 102. The operator workstation 102 may be used by an operator to archive the images, produce films, or send the images via a network to other facilities.

The MRI system 100 may also include one or more networked workstations 142. By way of example, a networked workstation 142 may include a display 144; one or more input devices 146, such as a keyboard and mouse; and a processor 148. The networked workstation 142 may be located within the same facility as the operator workstation 102, or in a different facility, such as a different healthcare institution or clinic.

The networked workstation 142, whether within the same facility or in a different facility as the operator workstation 102, may gain remote access to the data processing server 114 or data store server 116 via the communication system 140. Accordingly, multiple networked workstations 142 may have access to the data processing server 114 and the data store server 116. In this manner, magnetic resonance data, reconstructed images, or other data may be exchanged between the data processing server 114 or the data store server 116 and the networked workstations 142, such that the data or images may be remotely processed by a networked workstation 142. This data may be exchanged in any suitable format, such as in accordance with the transmission control protocol ("TCP"), the internet protocol ("IP"), or other known or suitable protocols.

As described, multi-FOV imaging may be achieved using parallel transmit systems to control for simultaneous acquisition. Alternatively, multi-coil systems may be used without the need for specialized parallel transmit hardware. For example, FIGS. 7A-7C and FIGS. 8A-8C provide example configurations that may be used to control multi-coil systems and provide multi-FOV imaging.

Figure 7A:
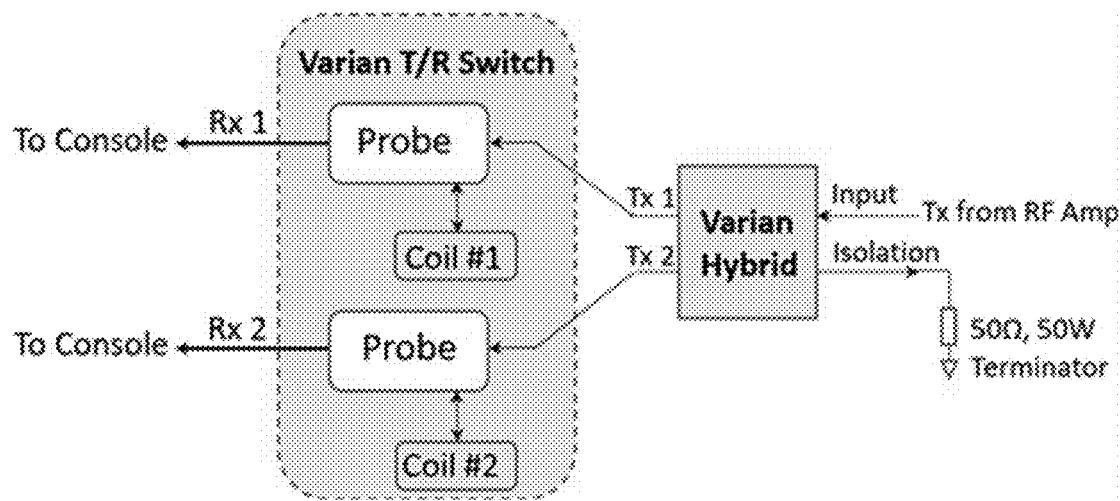
FIG. 7A is an Illustration of the RF frontend setup in accordance with one, non-limiting example of the present disclosure.
Figure 7B:
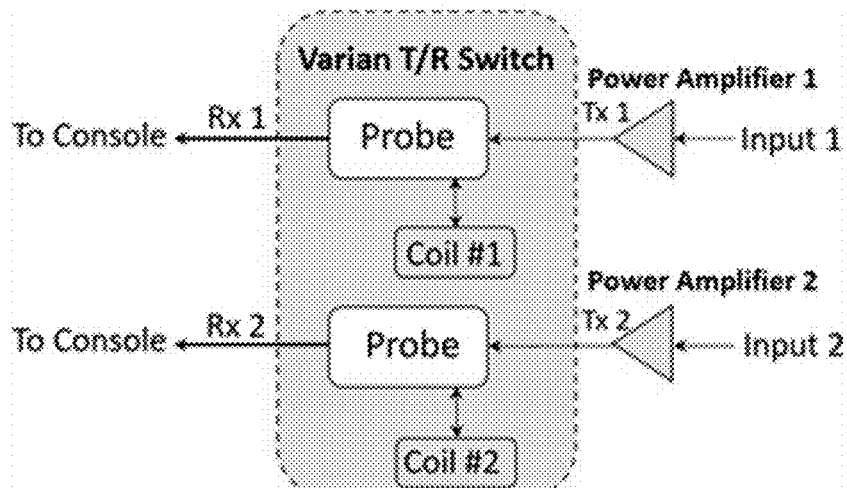
FIG. 7B is an illustration of a modification of the system of FIG. 7A to support fully independent RF transmit phase and amplitude control.
Figure 7C:
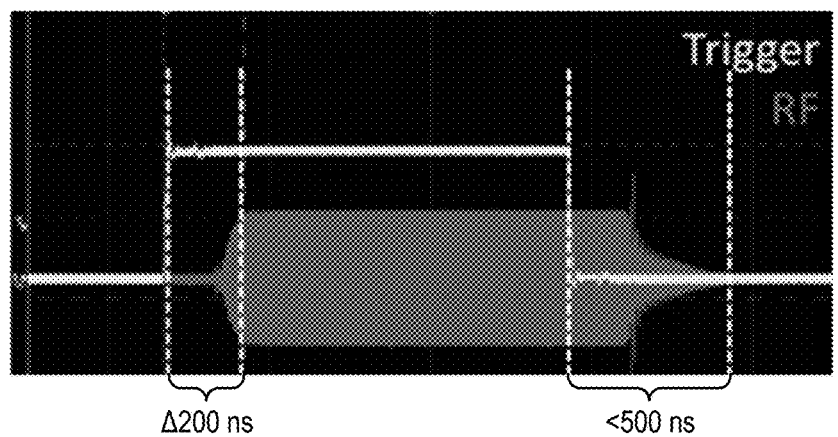
FIG. 7C is an example plot of an achievable T/R switching speed, demonstrating SWIFT acquisition in accordance with the present disclosure.

FIGS. 7A-7C show non-limiting examples of configurations for individual loop coil layouts, including tune/match and decoupling circuitry. For example, these configurations may serve as coils 128A/128B of FIG. 6. In one non-limiting example, two individual loop coils can be arranged to cover the full brain and the full spinal cord. As described, the coils 128A/128B are used to acquire respective FOVs simultaneously or substantially simultaneously. As such, the respective images can be temporally registered.

Alternatively, though FIG. 6 shows one patient and two coils 128A/128B used to simultaneously acquire data from two FOVs, it is contemplated that two patients may be imaged simultaneously. That is, two patients, each arranged with one of the coils 128A/128B and respective FOV could be imaged simultaneously.

In one non-limiting example, the coils can achieve better than −20 dB decoupling. As illustrated in FIG. 7A, a single channel RF transmit power signal can be split equally using a quadrature hybrid splitter and individual T/R switches for each transmit and receive channel. If more precise transmit power control of the individual coils is desired, this setup can be modified. For example, as shown in FIG. 7B, two individual RF power amplifiers can be used to support precise transmit phase and amplitude control on the small signal RF input side. To avoid short-T2 signals in the coil housing that are detectable by MB-SWIFT, the resonant circuit can be constructed on a skeleton-like form with minimal materials and maximum openings/apertures, and all housing components that are in close proximity to the resonant conductors can be fabricated from polytetrafluoroethylene. A system with <500 ns switching speed RF frontend can be used to support MB-SWIFT and ultra-short echo acquisition sequences, as illustrated in FIG. 7C. That is, FIG. 7C shows speed ~200 ns ON and 500 ns OFF times. These systems can use a programmable high-speed optical triggering device with 10 ps resolution, fast PIN drivers, and T/R switches that achieved switching speeds ≤500 ns, Tx-Rx isolation of 34.9 dB in receive mode and 44.8 dB in transmit mode. Furthermore, the PIN driver electronics can be extended to support active detuning of the dual RF coil to achieve an additional ~15 dB decoupling.

Figure 8A:
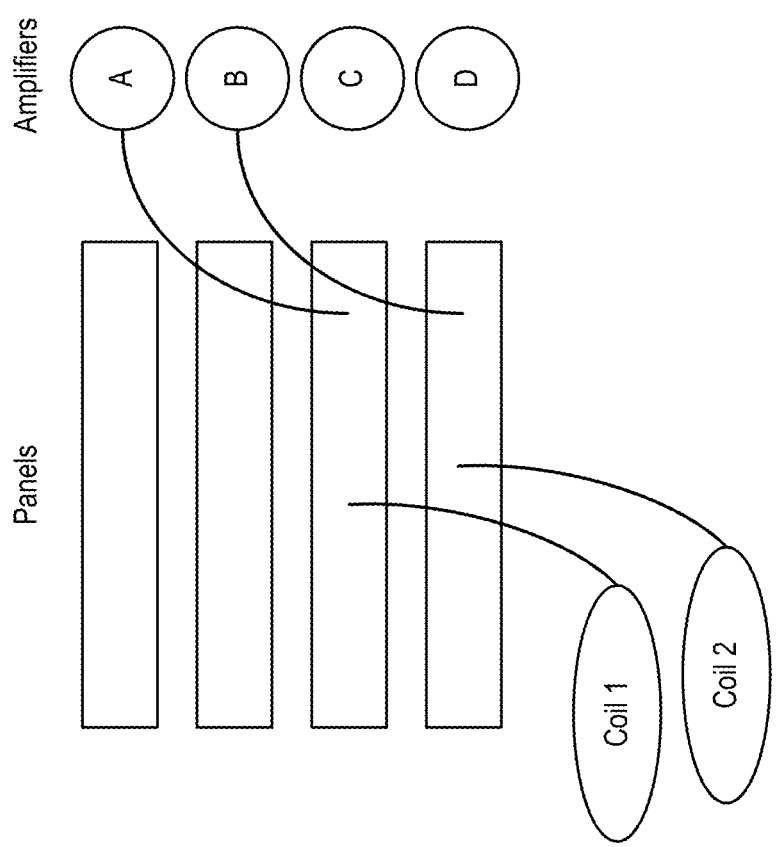
FIG. 8A shows an example configuration that may be used to control multiple transmit coils in accordance with the present disclosure.
Figure 8B:
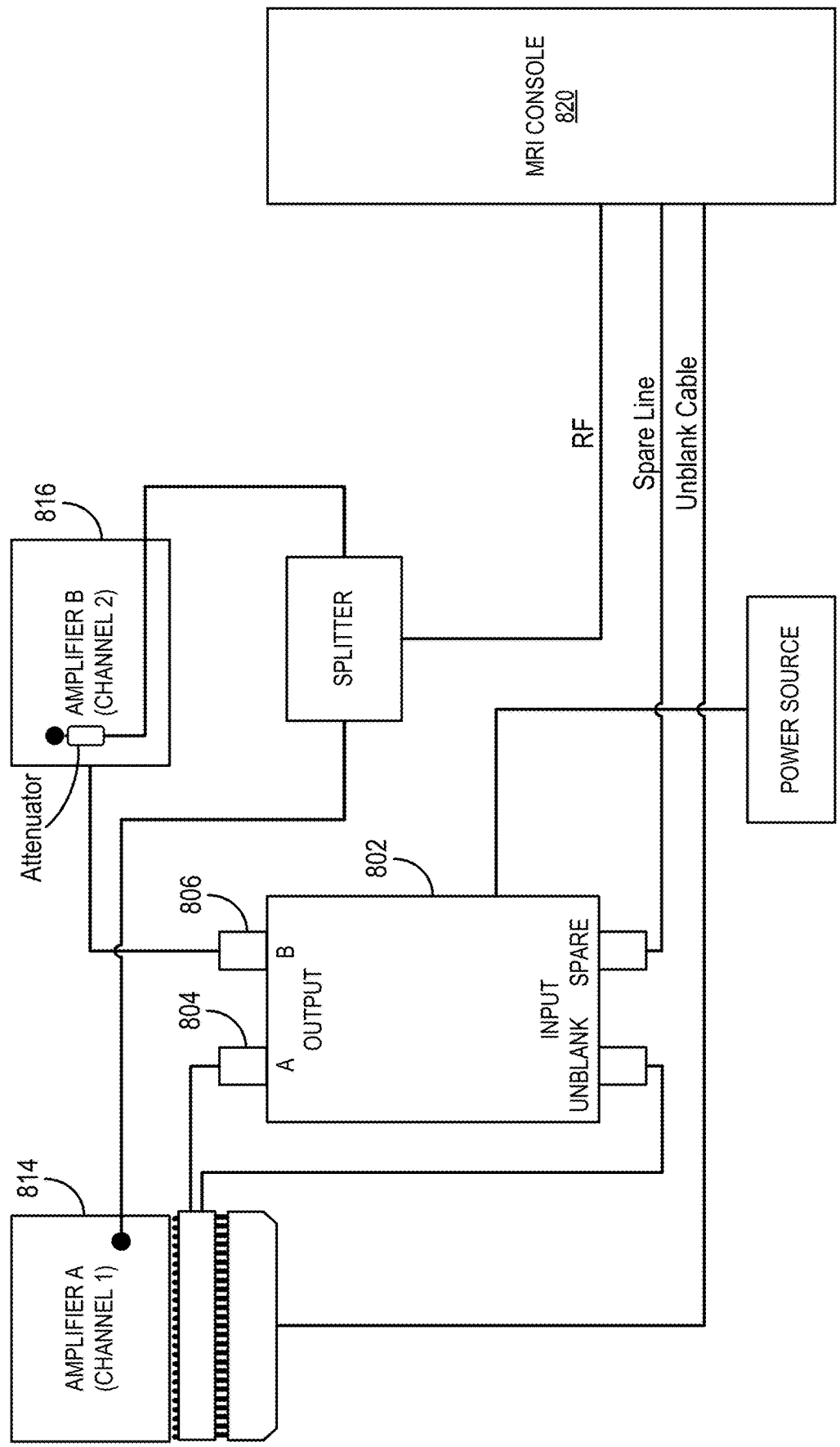
FIG. 8B shows an example configuration that may be used to achieve multi-FOV imaging.
Figure 8C:
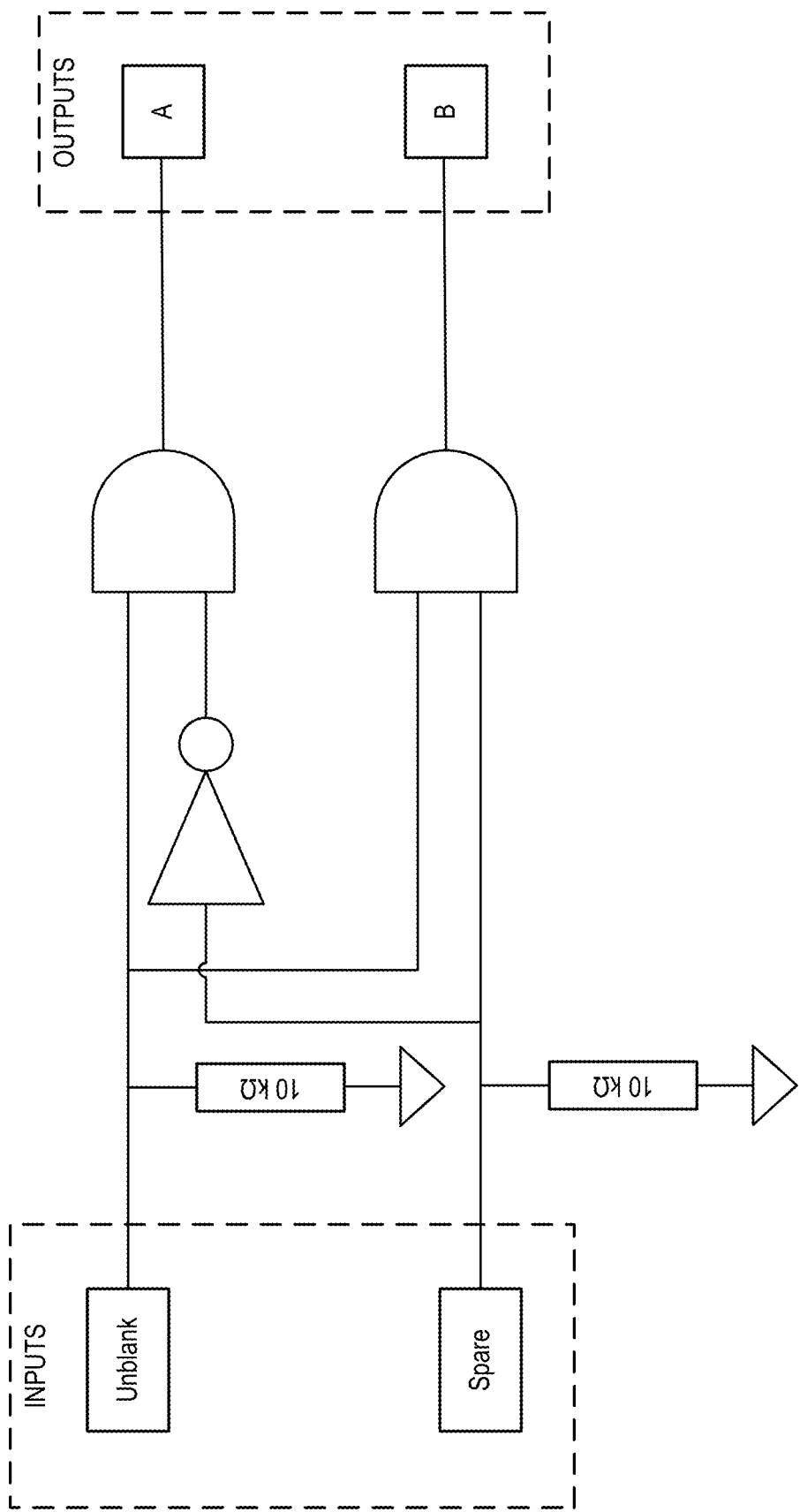
FIG. 8C shows an example amplifier blanking selector unit in accordance with the present disclosure.

As another non-limiting example, the multi-transmit coil setup can be achieved as shown in FIGS. 8A-8C. Such setup can circumvent the need for parallel transmit hardware systems, providing an inexpensive and accessible way to achieve multi-FOV imaging.

FIG. 8A demonstrates the connection of multiple transmit channels to various amplifiers, which can control the transmission of RF signal via the individual coils. As a non-limiting example, amplifier A can be connected to Coil 1 to controllably turn RF transmission of Coil 1 on and off while amplifier B can be connected to Coil 2 to controllably switch RF transmission of Coil 2 on and off. In this way, multiple RF transmit channels (e.g., Coil 1 and Coil 2) can be quickly switched on and off. Additional amplifiers and coils may be used to extend the setup for excitation of more than two FOVs.

FIG. 8B demonstrates an example configuration that can be used to control multiple amplifiers. The configuration may include an amplifier blanking selector unit 802, which can controllably switch the amplifiers. For example, the "A" output 804 may be connected to the "unblank" input of Amplifier A 814, while the "B" output 806 may be connected to the "unblank" input of Amplifier B 816. The MRI console 820 can provide "unblank" and "spare" signals to the amplifier blanking selector unit 802. Such unblanking can allow for independent RF transmission on multiple coils. However, active decoupling may also be employed.

FIG. 8C demonstrates an example configuration of an amplifier blanking selector unit. The input "unblank" signal can be distributed to output channel "A" or output channel "B" depending on the signal level on the "Spare" input. Thus, input signals can be used according to the following table to achieve the desired signal on output channels "A" and "B":

| Inputs | | Outputs | |
| --- | --- | --- | --- |
| Unblank | Spare | A | B |
| 0 | 0 | 0 | 0 |
| 0 | 1 | 0 | 0 |
| 1 | 0 | 1 | 0 |
| 1 | 1 | 0 | 1 |

The coil configuration and position can be optimized to achieve maximal and uniform SNR in the two FOVs. The coils may also be optimized for a particular anatomy, such as the full brain and the full spinal cord. The dimension and shape of the loops can be varied for patient or FOV. In some configurations a linear coil may be desired, whereas others may benefit from quadrature arrangements, such as dual loop (e.g., brain) or combined butterfly-loop (e.g., spine). The system can use active and/or passive decoupling.

Body motion caused by cardiac and respiratory cycles is a major source of physiological noise in the CNS, and it is much more pronounced in the spinal cord than in the brain. In addition, Bo fluctuations inherently originate from lung expansion during the respiratory cycles, and within-tissue fluid pulsations stem mostly from cardiac cycles. MB-SWIFT fMRI is more tolerant to Bo shifts caused by body motion than EPI. In addition, continuous radial acquisition allows recording of physiological noise in ms-range at the spoke level and motion correction in the k-space in 100-ms range at the sub-volume level, in contrast to the conventional fMRI with 1-2 s temporal resolution. Indeed, self-navigated features of radial acquisition have been successfully utilized for motion correction in brain fMRI with hybrid radial-cartesian EPI, however a combination of dense sampling of the k-space center and fast sparse sampling of the object by fully radial acquisition scheme has not been exploited. Retrospective removal of physiological noise has been previously performed using several approaches in human SC-fMRI. However such approaches require external monitoring and are prone to aliasing caused by the fMRI sampling rate being in the same range of the 60-100 beats/min heart rate even in humans. In mice and rats, with breathing and heart rates of 80-230 cycles/min and 310-840 beats/min, respectively, the aliasing limitation becomes even more prominent. The preliminary data described above, including radial sampling with 1-ms spokes, demonstrated the ability to both record and regress out respiratory signals without external monitoring, leading to more sensitive detection of activation. With the optimized spoke order, further improvements in removal of cardiac frequencies and motion can be realized.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for producing an image of a subject with a magnetic resonance imaging (MRI) system, the method comprising:
   acquiring first MRI data from the subject within a first field of view (FOV) excited using a first transmit coil;
   while acquiring the first MRI data, simultaneously acquiring second MRI data from the subject within a second FOV excited using a second transmit coil, wherein the second FOV is non-overlapping with the first FOV; and
   reconstructing images of the subject from the first MRI data and the second MRI data.

2. The method of claim 1, wherein the images of the subject reconstructed from the first MRI data and the second MRI data are temporally registered.

3. An MRI system comprising:
   a magnet configured to maintain a static magnetic field about a bore configured to receive a patient;
   a gradient system configured to apply magnetic gradients to the static magnetic field;

a radio-frequency (RF) system configured to send and receive RF energy with respect to the patient to acquire MRI data, the RF system comprising
a transmit coil system having at least two non-overlapping fields of view (FOVs) and a receive coil system configured to simultaneously acquire at least two distinct sets of MRI data from the patient; and
a computer system configured to reconstruct the at least two distinct sets of MRI data into images of at least two non-overlapping regions of the subject that are temporally registered.

4. The MRI system of claim 3, wherein at least one of the RF system and the transmit coil system include a switch configured to control selecting between the at least two non-overlapping FOVs.

5. A method for producing an image of a subject with a magnetic resonance imaging (MRI) system, the method comprising:
acquiring first MRI data from the subject within a first FOV excited using a first transmit coil, wherein the first FOV includes a head of the subject;
interleaved with or simultaneously with acquiring the first MRI data, acquiring second MRI data from the subject within a second FOV excited using a second transmit coil, wherein the second FOV includes a spine of the subject, including a portion of the spine lower than the cervical spine; and
reconstructing images of the subject including the spine and the head of the subject that are temporally registered.

6. The method of claim 5, wherein acquiring the first MRI data and the second MRI data includes controlling the MRI system to perform a multi-band pulse sequence.

7. The method of claim 5, wherein acquiring the first MRI data or the second MRI data includes performing a pulse sequence that includes:
applying a sweeping frequency excitation having a duration, the sweeping frequency excitation comprising a plurality of spaced apart radio frequency (RF) excitation pulses each having a pulse width and an inter-pulse spacing selected such that the sweeping frequency excitation simultaneously excites multiple different resonance frequencies at sidebands determined by the inter-pulse spacing; and
acquiring a time domain signal during the duration, the time domain signal being based on evolution of the spins.

8. The method of claim 5, further comprising applying a non-linear gradient configured to cancel out spins outside the first FOV or the second FOV.

9. The method of claim 5, wherein acquiring the first MRI data or the second MRI data includes performing a pulse sequence using radial frequency encoding readouts.

10. The method of claim 5, wherein the first MRI data or the second MRI data includes functional MRI (fMRI) data.

11. The method of claim 5, wherein to acquire the second MRI data interleaved with the first MRI data, a radial acquisition is performed with oversampling in a readout direction.

12. The method of claim 5, wherein the first MRI data or the second MRI data includes at least one of structural or quantitative MRI data.

13. The method of claim 5, wherein images of the subject including the spine and the head of the subject are temporally registered within 1 ms of one another.

14. The method of claim 5, wherein acquiring the first MRI data and the second MRI data includes controlling the MRI system to perform at least one of a sweep imaging with Fourier transformation (SWIFT) pulse sequence, a multi-band SWIFT (MB-SWIFT) pulse sequence, a zero-echo time (ZTE) pulse sequence, or an ultra-short echo time (UTE) pulse sequence.

15. A method for producing an image of a subject with a magnetic resonance imaging (MRI) system, the method comprising:
acquiring first MRI data from the subject within a first field of view (FOV) excited using a first transmit coil;
while acquiring the first MRI data, acquiring second MRI data from the subject within a second FOV excited using a second transmit coil, wherein the second FOV is non-overlapping with the first FOV; and
reconstructing images of the subject from the first MRI data and the second MRI data; and
wherein acquiring the first MRI data or the second MRI data includes performing a pulse sequence that includes:
applying a sweeping frequency excitation having a duration, the sweeping frequency excitation comprising a plurality of spaced apart radio frequency (RF) excitation pulses each having a pulse width and an inter-pulse spacing selected such that the sweeping frequency excitation simultaneously excites multiple different resonance frequencies at sidebands determined by the inter-pulse spacing; and
acquiring a time domain signal during the duration, the time domain signal being based on evolution of the spins.

16. The method of claim 15, wherein the inter-pulse spacing is selected to match a linear width of a voxel with a width of at least one of the sidebands.

17. The method of claim 15, wherein a spatial resolution of the images is increased by sequentially exciting a number of sidebands in each voxel of the image using an inherent spatial amplitude modulation.

18. The method of claim 15, wherein a spatial resolution of the images is increased by increasing a number of frequency domain samples associated with each sideband using a spatial phase modulation produced by the sweeping frequency excitation.

19. The method of claim 15, wherein the sweeping frequency excitation includes at least one of a continuous frequency modulation or a stepped frequency modulation.

20. The method of claim 15, further comprising applying a non-linear gradient configured to cancel out spins outside the first FOV or the second FOV.

21. The method of claim 15, wherein acquiring the first MRI data and the second MRI data includes controlling the MRI system to perform a multi-band pulse sequence.

22. A method for producing an image of a subject with a magnetic resonance imaging (MRI) system, the method comprising:
defining a shim volume that comprises a first field of view (FOV) and a second FOV that is non-overlapping with the first FOV;
while shimming over the shim volume, acquiring first MRI data from the subject within the first FOV excited using a first transmit coil;
while shimming over the shim volume and while acquiring the first MRI data, acquiring second MRI data from the subject within the second FOV excited using a second transmit coil, wherein the second FOV is non-overlapping with the first FOV; and
reconstructing images of the subject from the first MRI data and the second MRI data.

23. The method of claim 22, wherein acquiring the first MRI data and acquiring the second MRI data occur simultaneously or sequentially.

\* \* \* \* \*